United States Patent
Ota

(10) Patent No.: US 8,179,602 B2
(45) Date of Patent: May 15, 2012

(54) OPTICAL APPARATUS WITH IMAGE STABILIZING SYSTEM

(75) Inventor: Sayuri Ota, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 635 days.

(21) Appl. No.: 12/183,430

(22) Filed: Jul. 31, 2008

(65) Prior Publication Data

US 2009/0040612 A1     Feb. 12, 2009

(30) Foreign Application Priority Data

Aug. 7, 2007 (JP) ................... 2007-204918

(51) Int. Cl.
*G02B 27/64* (2006.01)
(52) U.S. Cl. ............... 359/557; 359/407; 396/55
(58) Field of Classification Search .............. None
See application file for complete search history.

(56) References Cited

U.S. PATENT DOCUMENTS

| | | | | |
|---|---|---|---|---|
| 5,637,860 A | * | 6/1997 | Shiomi ........... | 250/201.1 |
| 5,732,291 A | * | 3/1998 | Ohishi ........... | 396/55 |
| 5,794,081 A | * | 8/1998 | Itoh et al. ........ | 396/55 |
| 5,805,937 A | * | 9/1998 | Kitagawa ......... | 396/55 |

FOREIGN PATENT DOCUMENTS

| | | | |
|---|---|---|---|
| JP | 07-199122 A | | 8/1995 |
| JP | 10-221730 A | | 8/1998 |
| JP | 2001311976 A | * | 11/2001 |
| JP | 2002-237982 A | | 8/2002 |
| JP | 2003-143467 A | | 5/2003 |
| JP | 2006-184375 A | | 7/2006 |

* cited by examiner

*Primary Examiner* — Arnel C Lavarias
(74) *Attorney, Agent, or Firm* — Rossi, Kimms & McDowell LLP

(57) ABSTRACT

An optical apparatus 101 includes shake detecting means 102a, 102b, 103a, 103b, and 105 that detect a shake, an image stabilizing means 108a that operates so as to suppress an image shake, a drive means 115 that drives the image stabilizing means based on an output from the shake detecting means, a control means 104 that stops power supply to the drive means while continuing power supply to the shake detecting means in accordance with elapse of a predetermined time after the image stabilizing means starts the operation, and a power detecting means 116 that detects a remaining amount of a power source. The controller changes the predetermined time in accordance with the remaining amount of the power source detected by the power detecting means.

6 Claims, 8 Drawing Sheets

OPTICAL APPARATUS WITH IMAGE STABILIZING SYSTEM

BACKGROUND OF THE INVENTION

The present invention relates to an optical apparatus including an image stabilization system for suppressing an image shake. An optical apparatus such as binoculars, an image pickup apparatus, and an interchangeable lens includes an image stabilization system that detects a shake such as a hand shake by a shake sensor such as a gyro sensor and drives an optical element such as a lens so as to suppress an image shake based on the output from the shake sensor. Some image stabilization systems have the function to stop the image stabilizing operation by operating the image stabilization switch again after starting the image stabilizing operation in accordance with the operation of the image stabilization switch.

However, if the optical apparatus is not used to observe or image but continues to be just carried for a long time, the image stabilization system consumes a wasted power since the image stabilization system continues to operate in the meantime.

Therefore, the image stabilization system often has an energy-saving function in which the operation automatically stops or is changed to standby mode in accordance with the elapse of a predetermined time after the image stabilization system starts to operate.

FIG. 8 shows an energy-saving function of the image stabilization system. When an image stabilization switch (IS-SW) 81 is turned on at timing 81a, the system changes to an IS mode 82 (82a) for performing an image stabilizing operation. When the image stabilization switch 81 is turned off in the IS mode 82, the system switches from the IS mode 82 to a standby mode 83 (83a).

The standby mode means a condition in which the power supply to the drive circuit that moves an optical element is cut off with maintaining the power supply to the shake sensor. In case that the power supply is cut off, the shake sensor such as a gyro sensor needs a long time until the operation is stable even if the power supply resumes. This is because of an initial unstable factor of the sensor itself, and because of a charge time of a capacitor due to time constant of a high-pass filter or an integrator.

Therefore, for example Japanese Patent Laid-Open No. 7-199122 discloses an optical apparatus that is capable of resuming a stable operation of an image stabilization system in short time while reducing power consumption, by providing a standby mode that continues the power supply to a shake sensor even if the power supply to the drive circuit is cut off.

When the image stabilization switch 81 is turned on at timing 81c, the system performs the image stabilizing operation by changing to the IS mode 82. However, when a predetermined time (hereinafter referred to as IS time, for example 5 minutes) has elapsed, the system changes from the IS mode 82 to the standby mode 83 (83b).

In the standby mode 83, the predetermined time (hereinafter referred to as standby time, for example 3 minutes) has elapsed, the power supply to the system (other than the drive circuit including the shake sensor) is cuts off.

The optical apparatus as described above often uses a battery as a power source. The power of the battery can be used in the condition of the standby mode as well as the condition of the IS mode. Furthermore, when the remaining amount of the battery (voltage) decreases, wasting of the battery is faster since a current increases and an internal resistance also increases.

However, in a conventional image stabilization system, the IS time or the standby time is fixed regardless of a remaining amount of the battery. Therefore, in the condition where the remaining amount of the battery is particularly small, there is a possibility that wasted power is consumed more than in the condition where the remaining amount is enough.

BRIEF SUMMARY OF THE INVENTION

The present invention provides an optical apparatus in which an image stabilizing function can be used for a long time by reducing the wasted power consumption in the condition where the remaining amount of the battery is low.

An optical apparatus as one aspect of the present invention includes a shake detector that detects a shake, an image stabilizer that operates so as to suppress an image shake, a driver that drives the image stabilizer based on an output from the shake detector, a controller that stops power supply to the driver while continuing power supply to the shake detector in accordance with elapse of a predetermined time after the image stabilizer starts the operation, and a power detector that detects a remaining amount of a power source. The controller changes the predetermined time in accordance with the remaining amount of the power source detected by the power detector.

An optical apparatus as another aspect of the present invention includes a shake detector that detects a shake, an image stabilizer that operates so as to suppress an image shake, a driver that drives the image stabilizer based on an output from the shake detector, a controller that stops power supply to the shake detector in accordance with elapse of a predetermined time after the power supply to the driver stops, and a power detector that detects a remaining amount of a power source. The controller changes the predetermined time in accordance with the remaining amount of the power source detected by the power detector.

Other aspects of the present invention will be apparent from the embodiments described below with reference to the drawings.

DETAILED DESCRIPTION OF THE PREFERRED EMBODIMENTS

Exemplary embodiments of the present invention will be described below with reference to the accompanied drawings.

Embodiment 1

Figure 1:
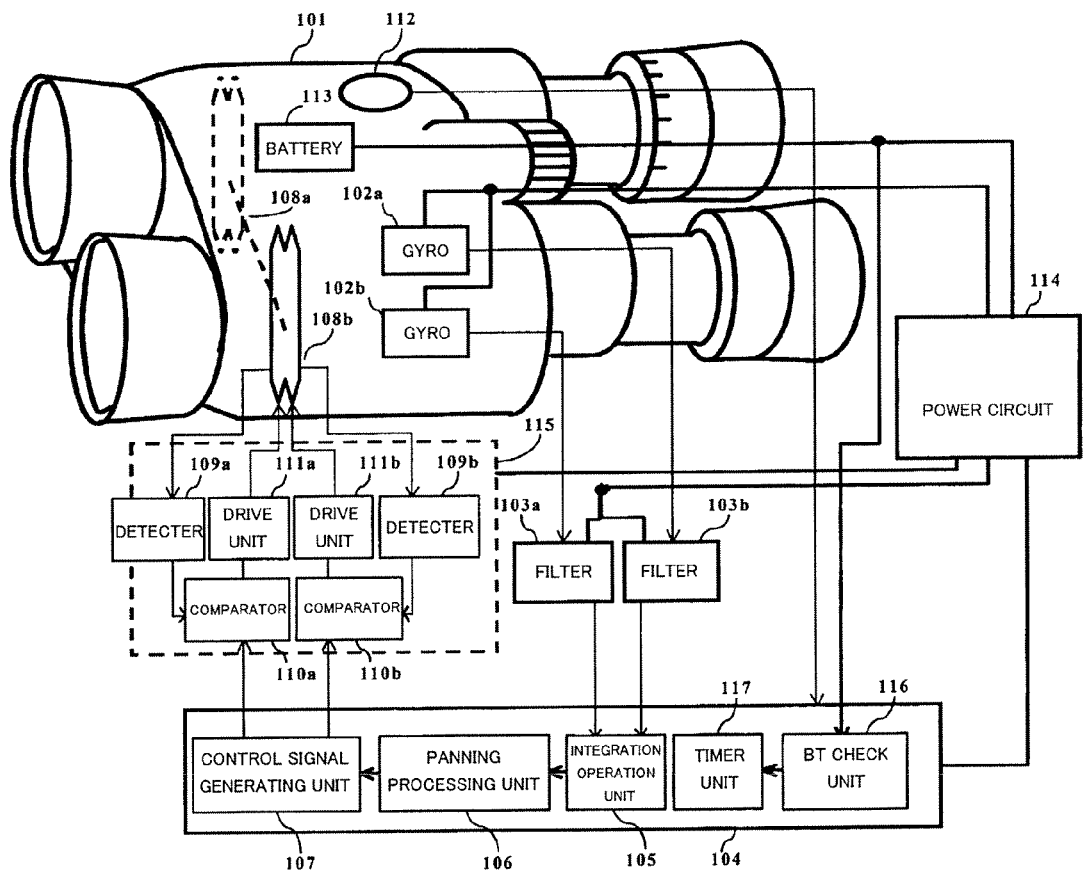
FIG. 1 is a diagram showing the configuration of binoculars that is embodiment 1 of the present invention.

FIG. 1 shows the configuration of binoculars or an observation apparatus as an optical apparatus that is embodiment 1 of the present invention. Reference numeral 101 denotes binoculars, in which an image stabilization system for reducing an image shake by a hand-shake at the time of observation is included as described below.

Reference numeral 102a denotes a pitch gyro as an angular velocity sensor which outputs an angular velocity signal in accordance with a shake in a pitch direction (in a vertical direction) of the binoculars 101. Reference numeral 102b is a yaw gyro as an angular sensor which outputs an angular velocity signal in accordance with a shake in a yaw direction (in a horizontal direction) of the binoculars 101.

Reference numerals 103a and 103b denote high-pass filters, which extract components in the frequency range occurred by the hand-shake, for example 0.5 to 30 Hz, from among the angular velocity signal outputted from the pitch gyro 102a and the yaw gyro 102b, respectively.

The gyros 102a and 102b, and high-pass filters 103a and 103b operate based on the supply of the operating power from a power circuit 114 described later.

Reference numeral 104 denotes a one-chip microcomputer (hereinafter merely referred to as "a microcomputer") as a control means (a controller), which operates based on the supply of the operating power from the power circuit 114. The microcomputer 104 includes an integration operating unit 105, a panning processing unit 106, and a control signal generating unit 107. The microcomputer 104 also includes a battery check unit 116 as a power detection means (a power detector) and a timer unit 117.

An integration operating unit 105 loads the angular velocity signal, which is inputted to the microcomputer 104 via high-pass filters 103a and 103b, via an A/D converter (not shown) in the microcomputer 104. The integration operating unit 105 performs integration of the angular velocity signal to convert it into an angular displacement signal. In other words, the integration operating unit 105 generates the angular displacement signal based on the output from the gyros 102a and 102b.

The panning processing unit 106 detects a condition where the binoculars 101 are panned, based on the angular velocity signal and the angular displacement signal from the integration operating unit 105. When the panning processing unit 106 detects the panning condition, it shifts the filter characteristics of the integration operating unit 105 to the high-frequency side. The frequency range of the angular velocity signal in the panning condition is lower than that of the hand-shake condition. Therefore, if the processing is performed by the same filter characteristics as that of the hand-shake condition, the amount of back-stepping of the image after panning is large and an observer feels discomfort. The feeling of the discomfort can be reduced by cutting the component of the frequency range peculiar to the panning condition from among the angular velocity signal.

A control signal generating unit 107 generates a control signal including amounts of drives in the pitch direction and in the yaw direction (hereinafter referred to as correction amount) for operating variable angle prisms 108a and 108b as described later so as to cancel the image shake, based on the angular displacement signal via the panning processing unit 106.

This correction amount is outputted as a digital signal via a D/A converter (not shown) in the microcomputer 104.

A shake detection system (a shake detector) includes the gyros 102a and 102b, the high-pass filters 103a and 103b, the integration operating unit 105, the panning processing unit 106, and the control signal generating unit 107.

The variable angle prisms (hereinafter referred to as VAP) 108a and 108b has a function as an image stabilizing means (an image stabilizer) for right eye and left eye, respectively. Each of the VAPs suppresses the image shake which is observed by each of eyes.

The VAPs includes two transparent plates that are placed opposite to each other, an accordion film surrounding the peripheral part of the transparent plates, and transparent liquid with high refractive index that is filled inside the transparent plates and the film. At least one of the two transparent plates is held by a holding frame that is rotatable around a pitch axis and a yaw axis. Rotating the transparent plates as well as the holding frame changes an angle (an apex angle) that is made by the two transparent plates to change the direction of a light beam that is incoming to the VAP and outgoing from the VAP. These controls can suppress the observed image shake.

The VAP for right eye 108a and the VAP for left eye 108b are coupled by a drive mechanism (not shown). Both of the VAPs 108a and 108b can be interlocked in a pitch direction and a yaw direction by working a driving force from actuators for a pitch direction and for a yaw direction to the drive mechanism. Each of the actuators includes a magnet coil which is fixed on the body of the binoculars, and a magnet and a yoke which are fixed on a member moving together with the VAPs 108a and 108b among the drive mechanism.

Reference numeral 115 denotes a VAP drive system as a drive means (a driver) for driving the VAPs 108a and 108b. The VAP drive system 115 includes drive units 111a and 111b, position detectors 109a and 109b, and comparators 110a and 110b. The VAP drive system also operates based on the supply of an operating power from a power circuit 114 described later.

The position detectors 109a and 109b detect positions (angles) of the VAPs 108a and 108b in a pitch direction and a yaw direction, respectively, and output a signal in accordance with the positions. Each of the position detectors 109a and 109b, for example, includes an infrared diode and a position sensitive detector.

The comparator 110a compares a position signal from the pitch direction position detector 109a with a pitch direction control signal from the control signal generating unit 107. The comparator 110b compares a position signal from the yaw direction position detector 109b with a yaw direction control signal from the control signal generating unit 107. Each of these comparators 110a and 110b includes an operational amplifier and outputs a differential signal between the position signal and the control signal.

The drive unit 111a includes an actuator for the pitch direction, and drives the VAPs 108a and 108b in the pitch direction based on the pitch differential signal from the pitch direction comparator 110a. The drive unit 111b includes an actuator for the yaw direction, and drives the VAPs 108a and 108b in the yaw direction based on the yaw differential signal from the yaw direction comparator 110b.

Reference numeral 112 denotes an image stabilization switch (hereinafter referred to as an IS switch). The IS switch 112 alternately outputs an image stabilization start signal (for example, a high level signal) and an image stabilization stop signal (for example, a low level signal) at every operation. A user can select so as to work or stop the image stabilization system by operating the IS switch 112. In the following description, the operation for outputting the image stabilization start signal is referred to as ON, and the operation for outputting the image stabilization stop signal is referred to as OFF.

Reference numeral 113 is a battery as a power source.

A power circuit 114 stabilizes the voltage from the battery 113 and supplies the operating power to each part described above.

A battery (BT) check unit 116 loads the voltage of the battery 113 (hereinafter referred to as a battery voltage) via an A/D converter (not shown) in the microcomputer 104 to detect the remaining amount of the battery 113 (the battery condition).

Figure 3:
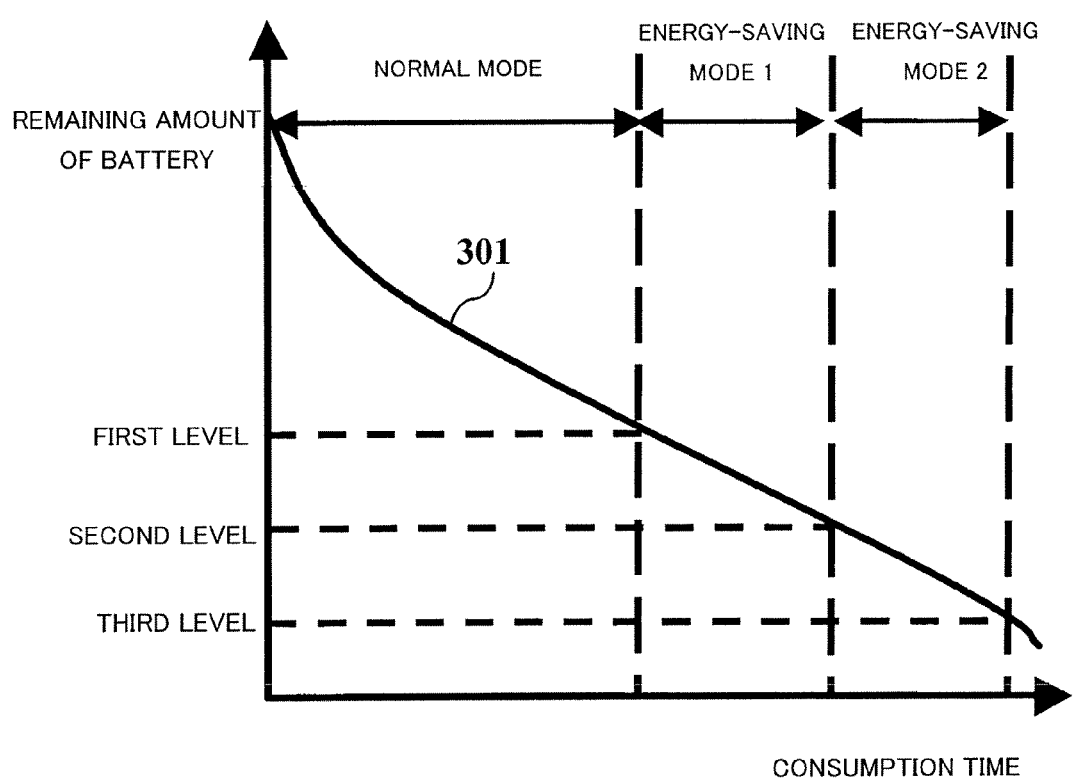
FIG. 3 is a diagram showing the relationship between the remaining amount of the battery and a setting mode of the timer time.

FIG. 3 shows discharge characteristics of the battery (an alkaline dry cell) 113, which is represented by reference numeral 301. When the binoculars 101 are used, the voltage of the battery 113 gradually decreases in accordance with the elapsed time from the condition in which the remaining amount of the battery is full. Therefore, the remaining amount of the battery 113 can be determined by detecting the battery voltage.

A timer unit 117 sets an IS timer time or a standby timer time as a predetermined time in accordance with the result detected by the BT check unit 116. The IS timer time and the standby timer time will be described later. The timer unit 117 also performs to count a time for determining whether or not the predetermined time has elapsed.

Next, referring to FIGS. 2 to 5, the processing performed by the image stabilization system will be described. The microcomputer 104 performs this processing in accordance with a computer program stored in an internal memory (not shown). This will be also true for embodiment 2 described later.

Figure 2:
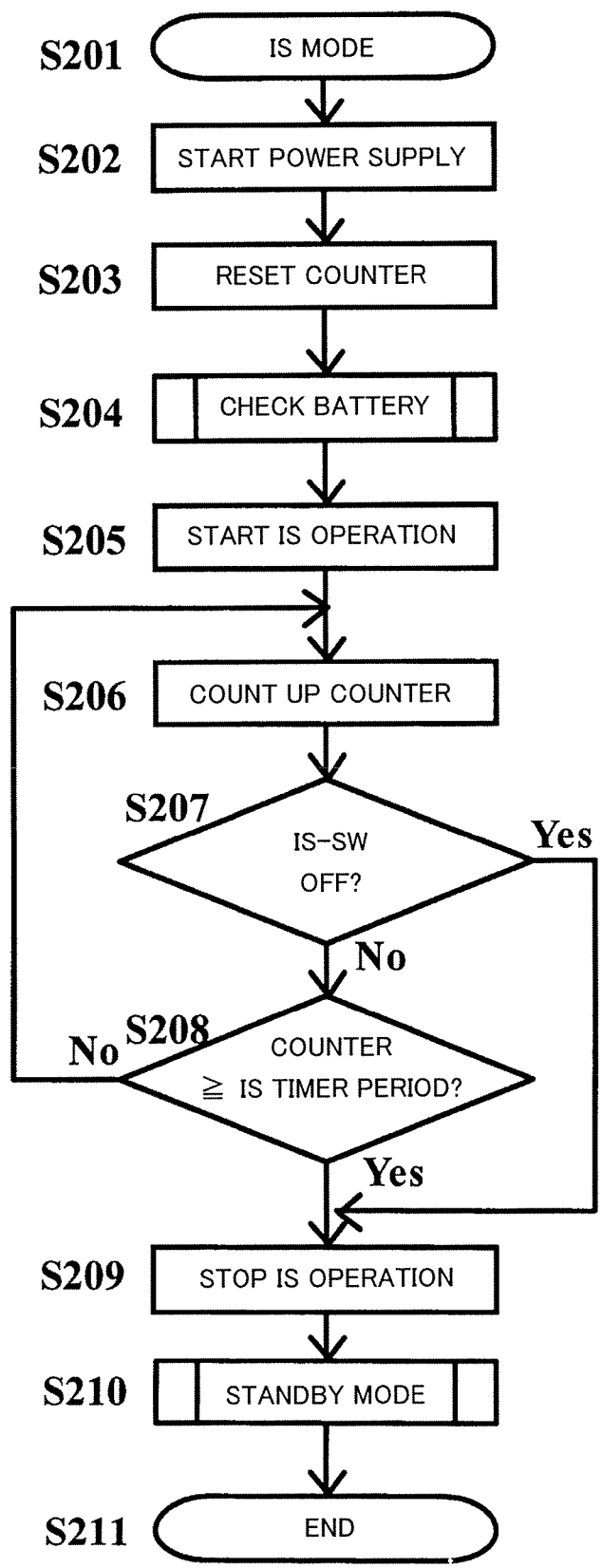
FIG. 2 is a flowchart showing the processing in an IS mode in embodiment 1.

FIG. 2 shows a processing in an IS mode in which the image stabilization system performs the image stabilizing operation.

At Step 201 ("Step" is abbreviated as "S" in the drawings), when the IS switch 112 is turned on, the microcomputer 104 starts the processing of the image stabilizing operation.

At Step 202, the microcomputer 104 starts to supply the power, from the power circuit 114, to the shake detection system including, as described above, the gyros 102a and 102b, the integration operating unit 105, the control signal generating unit 107, and the like, and the VAP drive system 115.

Next, at Step 203, the microcomputer 104 resets the counter in the timer unit 117 for counting the elapsed time from turning the IS switch on, that is, after starting the image stabilizing operation.

At Step 204, the microcomputer 104 commands the BT check unit 116 to detect the battery voltage and sets the IS timer time in accordance with the detected battery voltage (remaining amount). The battery check processing and the IS timer time setting will be described with reference to the flowchart shown in FIG. 4.

If the microcomputer 104 enters a battery check routine at Step 401, it determines whether or not the battery voltage detected by the BT check unit 116 is a third level shown in FIG. 3 or higher at Step 402. The third level is a threshold voltage that is set considering the minimum voltage for a guarantee of the proper operation of the microcomputer 104. When the battery voltage is the third level or higher, the microcomputer 104 permits the image stabilizing operation. On the other hand, when the battery voltage is lower than the third level, the microcomputer 104 proceeds to Step 406 and forces to cut off the power supply to the whole image stabilization system. The microcomputer 104 proceeds to Step 409 to complete the processing. When the battery voltage is the third level or higher, the microcomputer 104 proceeds to Step 403.

At Step 403, the microcomputer 104 determines whether or not the battery voltage is a second level shown in FIG. 3 or higher. The second level is set so that it is higher than the third level. When the battery voltage is lower than the second level, the microcomputer 104 proceeds to Step 407 and commands the timer unit 117 to set an IS timer time for energy-saving mode 2, for example 3 minutes. The microcomputer 104 proceeds to Step 409 to complete the processing. On the other hand, when the battery voltage is the second level or higher, the microcomputer 104 proceeds to Step 404.

At Step 404, the microcomputer 104 determines whether or not the battery voltage is a first level shown in FIG. 3 or higher. The first level is set so that it is higher than the second level. When the battery voltage is lower than the first level, the microcomputer 104 proceeds to Step 408 and commands the timer unit 117 to set an IS timer time for energy-saving mode 1, for example 4 minutes. The microcomputer 104 proceeds to Step 409 to complete the processing. On the other hand, the battery voltage is the first level or higher, the microcomputer 104 proceeds to Step 405.

At Step 405, the microcomputer 104 commands the timer unit 117 to set an IS timer time for normal mode, for example 5 minutes. Thus, the IS timer time is set so that it becomes short as the remaining amount of the battery 113 is reduced. The microcomputer 104 proceeds to Step 409 to complete the present routine.

When the setting the IS timer time in accordance with the battery voltage is completed by the above battery check routine, the microcomputer 104 starts the image stabilizing operation of the image stabilization system at Step 205 shown in FIG. 2, and counts up the counter of the timer unit 117 at Step 206.

Next, at Step 207, the microcomputer 104 determines whether or not the IS switch 112 is turned off. When the IS switch 112 is turned off, the microcomputer 104 proceeds to Step 209 to stop (stand by) the image stabilizing operation and further changes to the standby mode at Step 210.

At the standby mode, as described later, the microcomputer 104 cuts off (stop) the power supply to the VAP drive system 115 while maintaining the power supply to the shake detection system including the gyros 102a and 102b, the integration operating unit 105, the control signal generating unit 107, and the like.

On the other hand, when the IS switch 112 is not turned off, the microcomputer 104 proceeds to Step 208. At Step 208, the microcomputer 104 determines whether or not the counter of the timer unit 117 has attained the set IS timer time (3, 4 or 5 minutes), that is, the IS timer time has elapsed.

When the IS timer time has elapsed, the microcomputer 104 proceeds to Step 209 to stop (standby) the image stabilizing operation, and changes to the standby mode at Step 210. If the IS timer time has not elapsed yet, the microcomputer 104 returns to Step 206 to count up the counter. Since Steps 206 to 208 are invoked in a predetermined cycle, the time is measured by counting up the counter. This will be true for the standby mode as described later.

When the standby mode routine is completed at Step 210, the microcomputer 104 proceeds to Step 211 to complete the processing.

Next, the processing of the standby mode routine performed at Step 210 will be described with reference to FIG. 5.

When the microcomputer 104 enters the standby mode at Step 501, it commands the timer unit 117 to reset the counter that counts the elapse time after entering the standby mode at Step 502.

Next, at Step 503, the microcomputer 104 stops the power supply to the VAP drive system 115 that needs a lot of power consumption compared to the shake detection system.

Figure 4:
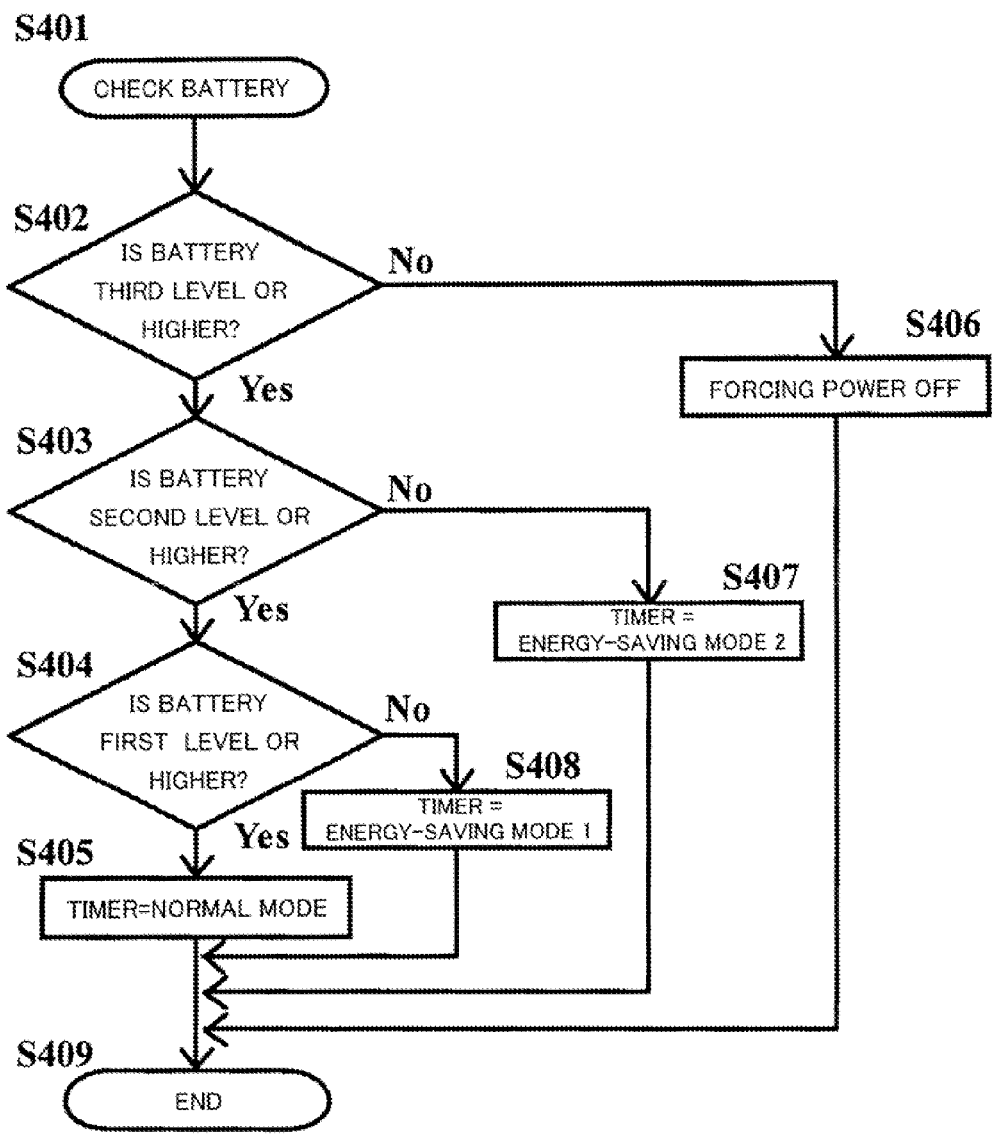
FIG. 4 is a flowchart of a battery check processing in embodiment 1.

At Step 504, the microcomputer 104 commands the BT check unit 116 to determine the battery voltage at the battery check routine shown in FIG. 4 and also commands the timer unit 117 to set the standby timer time in accordance with the battery voltage (remaining amount of the battery 113).

In the battery check routine in the standby mode, the microcomputer 104 basically performs the same processing as the battery check routine in the IS mode described above. However, when the battery voltage is lower than the second level (energy-saving mode 2) at Step 403, the microcomputer 104 commands the timer unit 117 to set the standby timer time for energy-saving mode 2, for example 1 minute at Step 407.

When the battery voltage is lower than the first level (energy-saving mode 1) at Step 404, the microcomputer 104 commands the timer unit 117 to set the standby timer time for energy-saving mode 1, for example 2 minutes. Furthermore, when the battery voltage is the first level or higher at Step 404 (normal mode), the microcomputer 104 commands the timer unit 117 to set the standby timer time for normal mode, for example 3 minutes.

Thus, the standby timer time as well as the IS timer time is set so that it becomes short as the remaining amount of the battery 113 is reduced.

Figure 5:
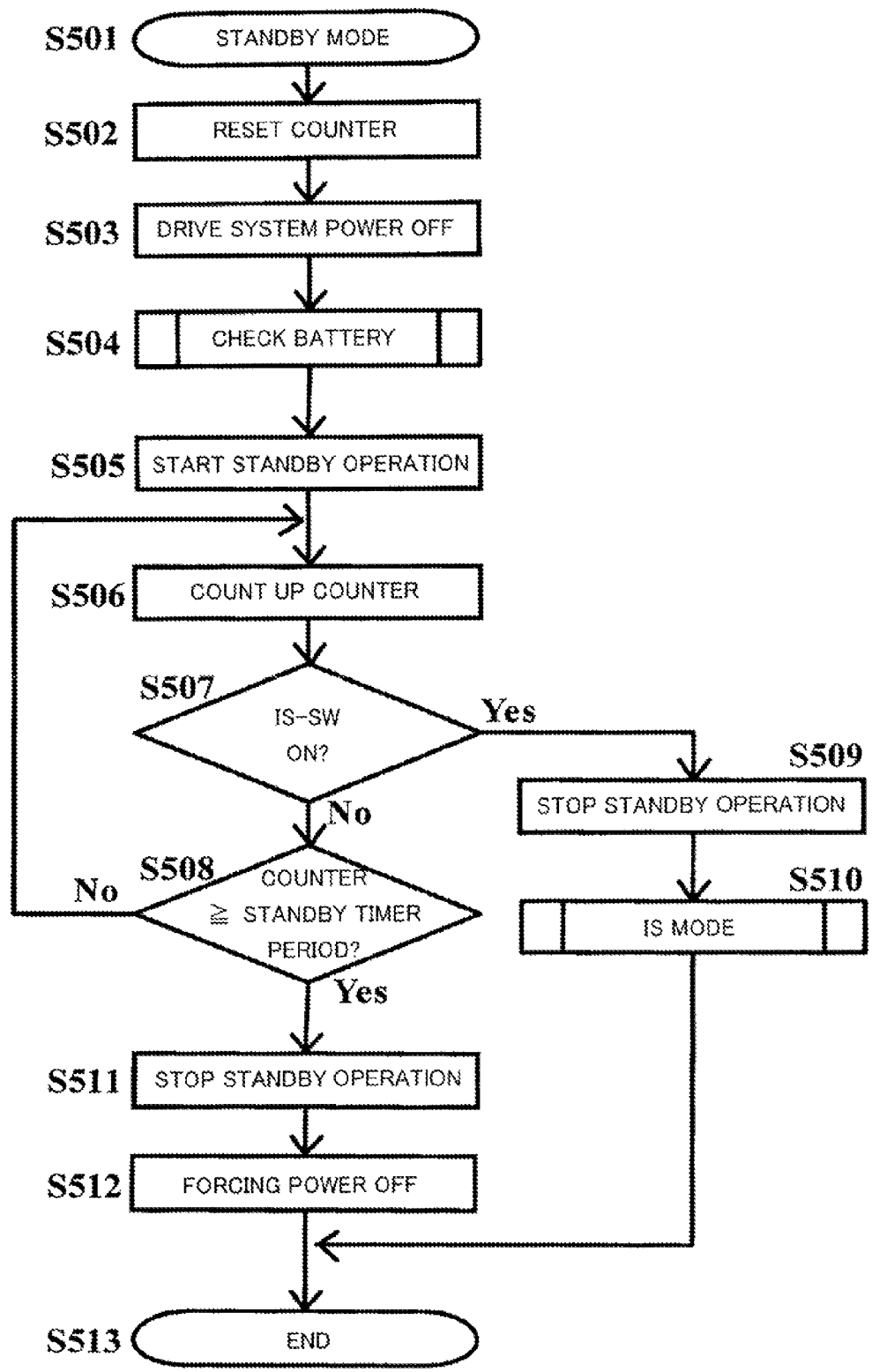
FIG. 5 is a flowchart showing the processing in a standby mode in embodiment 1.

When the setting of the standby timer time in accordance with the battery voltage is completed by the above battery check routine, the microcomputer 104 starts the standby operation of the image stabilizing system at Step 505 in FIG. 5 and counts up the counter of the timer unit 117 at Step 506.

Next, at Step 507, the microcomputer 104 determines whether or not the IS switch 112 is turned on. When the IS switch 112 is turned on, the microcomputer 104 proceeds to Step 509 to stop the standby operation. The microcomputer 104 changes the standby mode to the IS mode at Step 510. Thus, the power supply for the VAP drive system 115, which was stopped in the standby mode, resumes at Step 202 in FIG. 2. Originally, a shake detection system requires a long time after the power supply started and before the output stabilizes. However, since the power supply to the shake detection system is continued also in the standby mode, the microcomputer 104 can start the image stabilizing operation in a short time with high accuracy.

On the other hand, when the IS switch is not turned on at Step 507, the microcomputer 104 proceeds to Step 508 to determine whether or not the counter of the timer unit 117 has attained the set standby timer time (1, 2 or 3 minute(s)), that is, the standby timer time has elapsed.

If the counter has not attained the standby timer time, the microcomputer 104 returns to Step 506 and commands the timer unit 117 to count up of the counter.

If the counter has attained the standby timer time, the microcomputer 104 proceeds to Step 511 to stop the standby operation. The microcomputer 104 stops the power supply to the image stabilization system including the shake detection system other than the drive system at Step 512 and completes the present routine at Step 513.

According to the processing described above, the IS timer time (the time from the start of the image stabilizing operation to the change to the standby mode) and the standby timer time (the time from the start of the standby mode to the stop of the power supply to the whole system) are changed in accordance with the condition (remaining amount) of the battery 113. Thus, the wasted power consumption of the battery 113 (waste of the battery 113) can be reduced, and the time in which the image stabilizing operation by the image stabilization system is possible can be lengthened.

Embodiment 2

Figure 6:
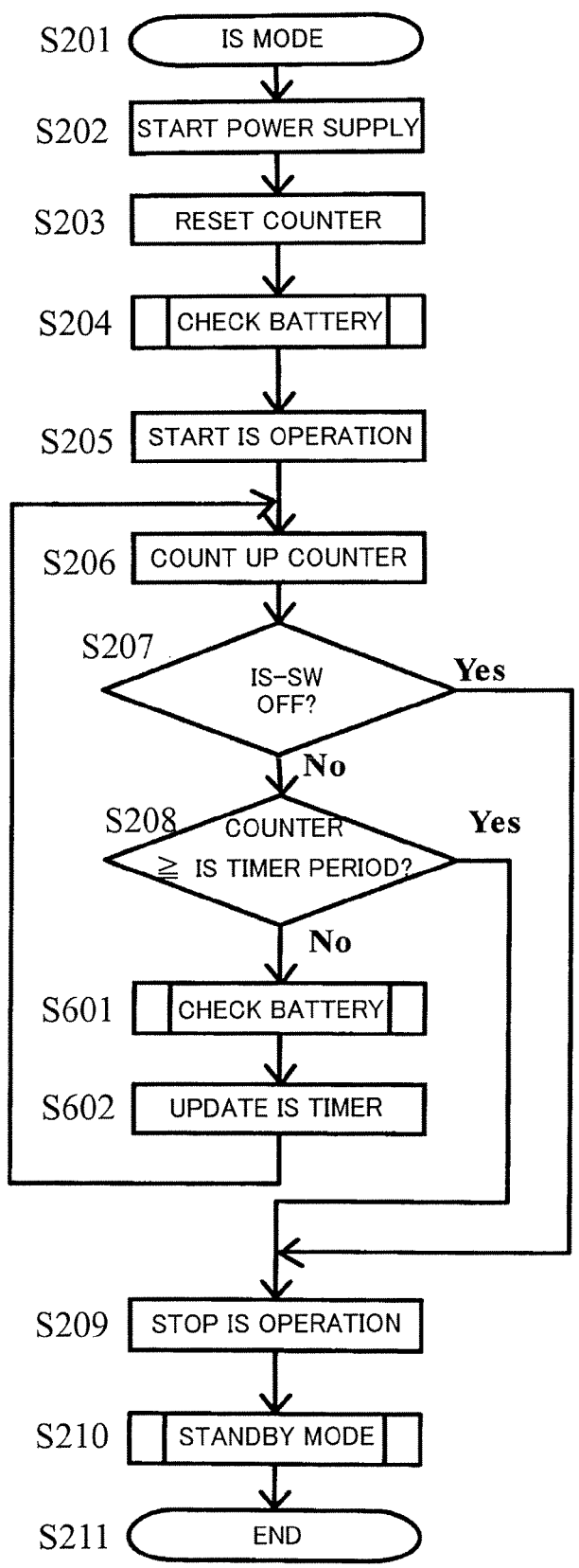
FIG. 6 is a flowchart showing the processing in an IS mode of binoculars that is embodiment 2 of the present invention.
Figure 7:
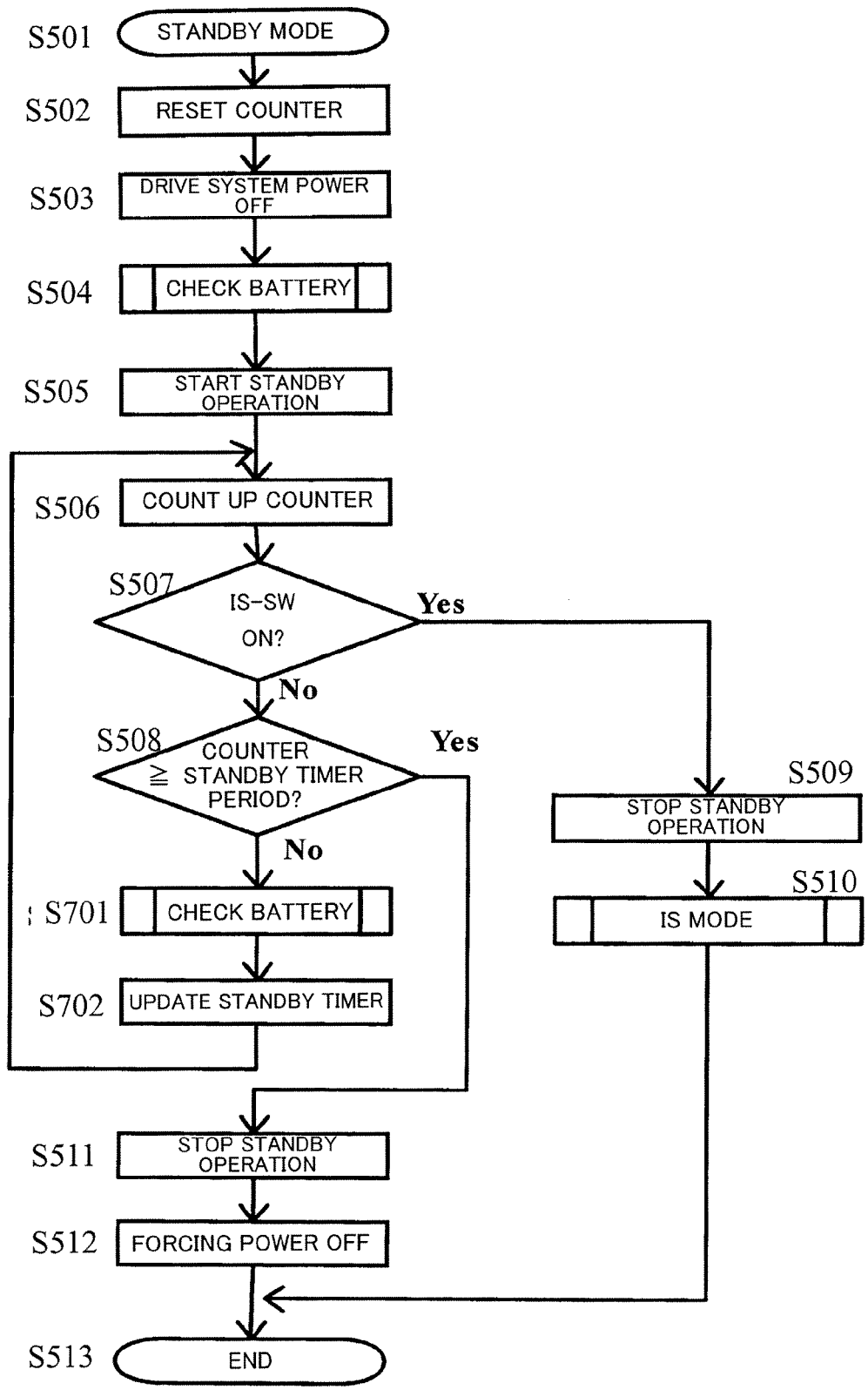
FIG. 7 is a flowchart showing the processing in a standby mode in embodiment 2.
Figure 8:
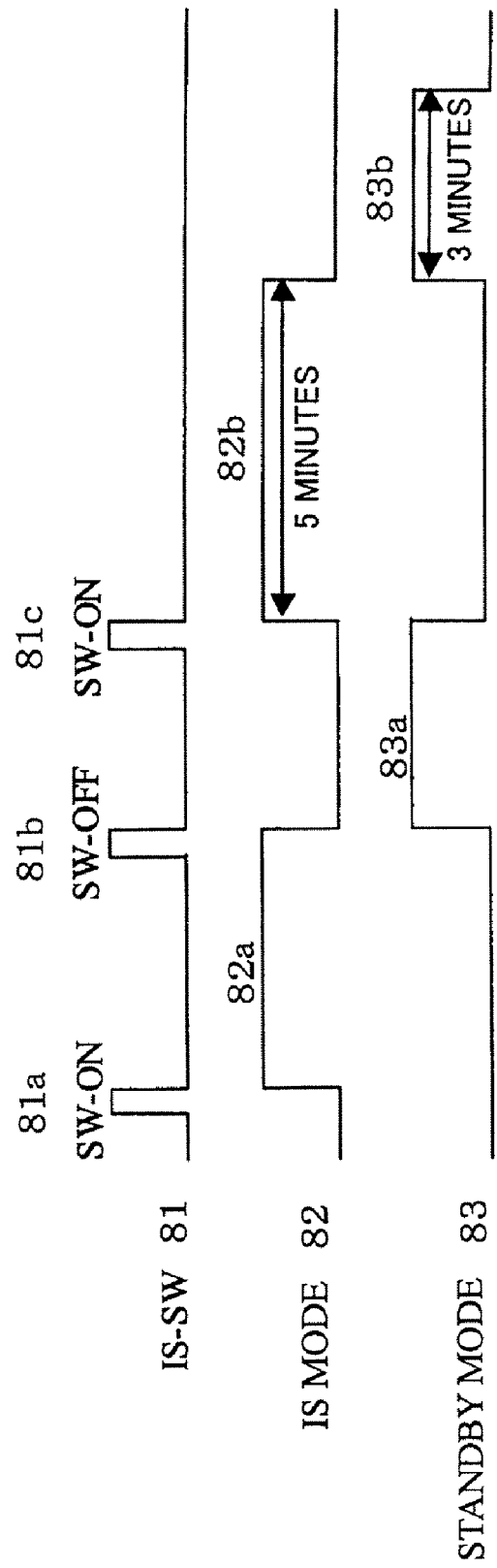
FIG. 8 is a timing chart showing an operation of an image stabilization system in binoculars.

FIGS. 6 and 7 show the processing of an image stabilization system of an optical apparatus that is embodiment 2 of the present invention. This processing is performed in the binoculars 101 described in embodiment 1. Therefore, the same configuration as that of embodiment 1 will be described with the same numerals as those of embodiment 1. In FIGS. 6 and 7, the same numerals will be used for the same steps as those of FIGS. 2 and 5 in embodiment 1, and the description on the steps will be omitted.

FIG. 6 shows the processing in the IS mode that commands the image stabilization system to perform the image stabilizing operation. Steps 201 to 208 are the same as those of embodiment 1 (FIG. 2).

After starting the image stabilizing operation, when the IS switch 112 is not turned off and the counter of the timer unit 117 has not attained the IS timer time at Step 208, the microcomputer 104 proceeds to Step 601.

At Steps 601 and 602, the microcomputer 104 performs the battery check processing and resetting (updating) the IS timer time in accordance with the flowchart shown in FIG. 4.

For example, the microcomputer 104 determines that it is normal mode (the battery voltage is the first level or higher) in the battery check processing at Step 204, after setting the IS timer time of 5 minutes, the battery voltage decreases before the battery check processing at Step 601. Furthermore, the microcomputer 104 determines that it is energy-saving mode 1 (the battery voltage is the second level or higher) at Step 404 of FIG. 4. In this case, if the IS timer time set at Step 408 of FIG. 4 is 4 minutes, the IS timer time of 5 minutes is updated to 4 minutes at Step 602. If the microcomputer 104 determines that it is again normal mode, the IS timer time of 5 minutes is maintained.

For example, the microcomputer 104 determines that it is energy-saving mode 1 (the battery voltage is the second level or higher) in the battery check processing at Step 204, after setting the IS timer time of 4 minutes, it determines that it is energy-saving mode 2 (the battery voltage is the third level or higher) in the battery check processing at Step 601. In this case, if the IS timer time set at Step 408 of FIG. 4 is 3 minutes, the IS timer time of 4 minutes is updated to 4 minutes at Step 602. If the microcomputer 104 determines that it is again energy-saving mode 1, the IS timer time of 4 minutes is maintained.

Thus, the microcomputer 104 rechecks the battery voltage before the IS timer time set at Step 204 elapses, and changes (updates) the IS timer time in accordance with the change (decrease) of the battery voltage in order to make it possible to more effectively reduce the wasted power consumption (waste of the battery).

After the microcomputer 104 updated (or maintained) the IS timer time, it returns to Step 206.

FIG. 7 shows the processing in a standby mode in the present embodiment. Steps 501 to 510 are the same as those of embodiment 1 (FIG. 5).

After starting the standby operation, if the IS switch 112 is not turned on and the counter of the timer unit 117 has not attained the standby timer time at Step 508, the microcomputer 104 proceeds to Step 701.

At Steps 701 and 702, the microcomputer 104 performs the battery check processing and resets (updates) the standby timer time in accordance with the flowchart shown in FIG. 4.

For example, the microcomputer 104 determines that it is normal mode (the battery voltage is the first level or higher) in the battery check processing at Step 504, after setting the standby timer time of 3 minutes, the battery voltage decreases before the battery check processing at Step 701. Furthermore, the microcomputer 104 determines that it is energy-saving mode 1 (the battery voltage is the second level or higher) at Step 404 of FIG. 4. In this case, if the standby timer time set at Step 408 of FIG. 4 is 2 minutes, the standby timer time of 3 minutes is updated to 2 minutes at Step 702. If the microcomputer 104 determines that it is again normal mode, the standby timer time of 3 minutes is maintained.

For example, the microcomputer 104 determines that it is energy-saving mode 1 (the battery voltage is the second level or higher) in the battery check processing at Step 504, after setting the standby timer time of 2 minutes, it determines that it is energy-saving mode 2 (the battery voltage is the third level or higher) in the battery check processing at Step 701. In this case, if the standby timer time set at Step 408 of FIG. 4 is 1 minute, the standby timer time of 2 minutes is updated to 1 minute at Step 702. If the microcomputer 104 determines that it is again energy-saving mode 1, the standby timer time of 2 minutes is maintained.

Thus, the microcomputer 104 rechecks the battery voltage before the standby timer time set at Step 504 elapses, and changes (updates) the standby timer time in accordance with the change (decrease) of the battery voltage in order to make it possible to more effectively reduce the wasted power consumption (waste of the battery).

After the microcomputer 104 updated (or maintained) the standby timer time, it returns to Step 206.

As described above, in the present embodiment, before the IS timer time and the standby timer time previously set in accordance with the condition (remaining amount) of the battery 113 elapse, the microcomputer 104 again detects the condition of the battery 113, and changes the IS timer time and the standby timer time in accordance with the detected result. Thus, the waste of the battery can be more effectively reduced since the IS timer time and the standby timer time can be changed while estimating the condition of the battery 113 at short time intervals. Therefore, the time in which the image stabilization system is possible to perform the image stabilizing operation can be lengthened.

Furthermore, the present invention is not limited to these embodiments and various variations and modifications may be made without departing from the scope of the present invention.

For example, in each of the above embodiments, the VAP is used as an image stabilizing means. However, in the present invention, an image stabilizing means that shifts or rotates a lens can also be applied.

In each of the above embodiments, the timer time is changed in accordance with the battery condition (the remaining amount of the battery) in both the IS mode and the standby mode. However, the timer time can be configured so as to be changed only in either one of these modes.

In each of the above embodiments, the battery condition (remaining amount of the battery) is divided into three levels, and the timer time is changed at each of the levels. However, the battery condition can be divided into the levels more than 3, or the timer time can be continuously changed in proportion to the battery voltage. The timer time can be set so as to be proportional to the square of the battery voltage.

Furthermore, in each of the above embodiments, the binoculars were described as one of optical apparatuses. However, the present invention can also be applied to other optical apparatuses such as a telescope, a digital still camera, an interchangeable lens, and a video camera.

This application claims the benefit of Japanese Patent Application No. 2007-204918, filed on Aug. 7, 2007, which is hereby incorporated by reference herein in its entirety.

What is claimed is:

1. An optical apparatus comprising:
a shake detector that detects a shake;
an image stabilizer that operates so as to reduce an image shake;
a driver that drives the image stabilizer based on an output from the shake detector;
a power detector that detects a remaining amount of a power source supplying an operating power to the image stabilizer; and
a controller configured to perform an operation of an IS mode that reduces the image shake by the image stabilizer, and to perform an operation of a standby mode that stops power supply to the driver while continuing power supply to the shake detector in accordance with elapse of a predetermined time after the image stabilizer starts a stabilizing operation,
wherein the controller sets the predetermined time to a short amount as the remaining amount of the power source detected by the power detector becomes short.

2. An optical apparatus according to claim 1,
wherein the controller again detects the remaining amount of the power source by the power detector in the operation of the IS mode, and changes the predetermined time in accordance with an updated result detected by the power detector.

3. An optical apparatus according to claim 1,
wherein the controller sets the predetermined time in a first time when the remaining amount of the power source detected by the power detector is more than a predetermined level, and sets the predetermined time in a second time shorter than the first time when the remaining amount of the power source is less than the predetermined level.

4. An optical apparatus according to claim 1,
wherein, when the remaining amount of the power source detected by the power detector is less than a predetermined amount, the controller sets the predetermined time shorter than that when the remaining amount of the power source detected by the power detector is more than the predetermined amount.

5. An optical apparatus according to claim 1,
wherein the controller sets the predetermined time using a first remaining amount information detected by the power detector before the image stabilizer starts the stabilizing operation, and, by using a second remaining amount information again detected by the power detector after the image stabilizer starts the stabilizing operation, changes the predetermined time set by using the first remaining amount information.

6. An optical apparatus according to claim 1,
wherein the image stabilizer starts the stabilizing operation in response to an operation of an IS switch.

* * * * *